US011413769B1

(12) United States Patent
Nielson (10) Patent No.: US 11,413,769 B1
(45) Date of Patent: Aug. 16, 2022

(54) END EFFECTOR ASSEMBLY AND METHOD FOR ROBOT-ENABLED MANIPULATION OF ROUND OBJECTS

(71) Applicant: Quantum Innovations, Inc., Central Point, OR (US)

(72) Inventor: Wade E. Nielson, Central Point, OR (US)

(73) Assignee: QUANTUM INNOVATIONS, INC., Central Point, OR (US)

( * ) Notice: Subject to any disclaimer, the term of this patent is extended or adjusted under 35 U.S.C. 154(b) by 624 days.

(21) Appl. No.: 16/529,413

(22) Filed: Aug. 1, 2019

Related U.S. Application Data (60) Provisional application No. 62/735,733, filed on Sep. 24, 2018.

(51) Int. Cl.
*B25J 15/00* (2006.01)
*B25J 9/16* (2006.01)

(52) U.S. Cl.
CPC ......... *B25J 15/0033* (2013.01); *B25J 9/1694* (2013.01); *B25J 15/009* (2013.01)

(58) Field of Classification Search
CPC ..... B25J 15/0033; B25J 15/009; B25J 9/1694
See application file for complete search history.

(56) References Cited

U.S. PATENT DOCUMENTS

| 4,544,193 | A | 10/1985 | Dunn et al. |
| 4,599,414 | A | 7/1986 | Sugimoto et al. |
| 4,770,456 | A | 9/1988 | Phillips et al. |
| 4,995,148 | A | 2/1991 | Bonomi et al. |
| 5,768,768 | A | 6/1998 | Best |
| 7,090,559 | B2 | 8/2006 | Vulich et al. |
| 7,114,243 | B2 * | 10/2006 | Nayar ............... B25J 9/1687 29/603.03 |
| 9,394,605 | B1 | 7/2016 | Kester et al. |
| 9,580,805 | B2 | 2/2017 | Kester et al. |
| 10,732,060 | B2 * | 8/2020 | Strauss ............... G01L 5/009 |
| 2003/0130759 | A1 * | 7/2003 | Kesil ............... B25J 9/1633 700/192 |
| 2011/0628548 | | 11/2011 | Doll |
| 2018/0120181 | A1 * | 5/2018 | Kamiya ............ H01L 41/1132 |

FOREIGN PATENT DOCUMENTS

WO WO-2008015460 A2 * 2/2008 ............ B25J 13/085

* cited by examiner

*Primary Examiner* — Stephen A Vu
(74) *Attorney, Agent, or Firm* — Jerry Haynes Law (57) ABSTRACT

An end effector assembly and method for robot-enabled manipulation of round objects automates the gripping, rotationally manipulating, loading, and unloading of round objects, like an ophthalmic substrate, to a coating machine subassembly. A lens wheel carries spring-loaded retention pegs that grip and release the round object. Springs selectively generate tension on the retention pegs, causing retention pegs to articulate radially inward or outward, so as to press the round object to the lens wheel, or release the object. A retention peg actuator selectively engages the springs to generate tension and release tension from springs. A processor regulates articulation of the retention peg actuator. A sensor detects the position of the object, whereby at least one position of the round object triggers the sensor to transmit a signal commanding the retention peg actuator to articulate. A human-machine interface transmits command signals and displays positions of the lens wheel and retention pegs.

19 Claims, 7 Drawing Sheets

END EFFECTOR ASSEMBLY AND METHOD FOR ROBOT-ENABLED MANIPULATION OF ROUND OBJECTS

CROSS-REFERENCE TO RELATED APPLICATIONS

This application claims the benefits of U.S. provisional application No. 62/735,733, filed Sep. 24, 2018 and entitled ROBOT-ENABLED RADIAL GRIPPING DEVICE AND METHOD FOR AUTOMATED GRASPING OF CYLINDRICAL OBJECTS, which provisional application is incorporated by reference herein in its entirety.

FIELD OF THE INVENTION

The present invention relates generally to an end effector assembly and method for robot-enabled manipulation of round objects. More so, the end effector assembly is adapted to automate the gripping, manipulating, loading, and unloading of a round object, such as an ophthalmic substrate, through use of a lens wheel having spring-loaded articulating retention pegs; and further an operator, through use of a human-machine interface, controls the lens wheel, and a robotic subassembly that carries the lens wheel to a conveyor and coating machine subassembly, such as a vapor deposition subassembly for treating the round object.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, ophthalmic substrates, such as lenses are treated to provide specific optical properties. This can include deposition of a coating thereon. In one instance, abrasion-resistant coatings are applied to lens surfaces by spin coating, dip coating, spray coating, and flow coating techniques. These techniques have been successful when used to coat smooth surfaces, such as the optical surface of single vision spectacle lenses. Though physical vapor deposition a coating can be applied to the surface of a lens or other optical device in order to change one or more optical properties of the device.

Generally, antireflective coatings help reduce surface reflections that occur at one or more interfaces between the lens and air. One such commonly used coating is an HEV absorbing material that is antireflective and transmits a substantial amount of light for the rest of spectrum. The HEV absorbing material allows an ophthalmic substrate, such as a glass lens. Often, the process of coating the ophthalmic substrate requires a physical vapor deposition machine. The substrate is carried to the machine, which can be time-consuming.

Other proposals have involved coating and processing systems for round-shaped ophthalmic substrates. The problem with these coating and processing systems is that they do not automate the conveyance of the substrate to the coating machine. Also, the operator does not have full control of the conveyance process and coating process simultaneously. Even though the above cited coating and processing systems meet some of the needs of the market, an end effector assembly and method for robot-enabled manipulation of round objects configured to automate the gripping, manipulating, loading, and unloading of a round object, such as an ophthalmic substrate, through use of a lens wheel having spring-loaded articulating retention pegs; and further an operator, through use of a human-machine interface, controls the lens wheel, and a robotic subassembly that carries the lens wheel to a conveyor and coating machine subassembly, such as a vapor deposition subassembly for treating the round object, is still desired.

SUMMARY

Illustrative embodiments of the disclosure are generally directed to an end effector assembly and method for robot-enabled manipulation of round objects. The end effector assembly automates the gripping, manipulating, loading, and unloading of a round object, like an ophthalmic substrate, to a coating machine subassembly. This automated, controlled manipulation of the round object is known in the art to facilitate the loading and unloading of an ophthalmic substrate during physical vapor deposition coating in a PVD coating machine. The present invention is, however, operable for treating any round object through various coating means known in the art.

In some embodiments, the end effector assembly may include a lens wheel that comprises spring-loaded retention pegs operable to grip, rotate, and release the round object. The retention pegs utilize springs that selectively generate tension on the retention pegs, causing the retention pegs to articulate radially inward or outward, so as to press the round object to the lens wheel, or release the object. A retention peg actuator selectively engages the springs to generate tension and release tension from springs.

In some embodiments, the end effector assembly may include a processor that regulates articulation of the retention peg actuator. A sensor detects the position of the object, whereby at least one position of the round object triggers the sensor to transmit a signal commanding the retention peg actuator to articulate. A human-machine interface transmits command signals to a receiver, and displays the position of lens wheel and retention pegs through a graphical interface, so that an operator can optimize manipulation and conveyance of the round object.

In some embodiments, the end effector assembly may include a spring-loaded lens wheel. The lens wheel is configured to grasp the cylindrical or disc-shaped object through retention pegs that are constrained and released through use of springs. A retention peg actuator engages the springs to force the retention pegs to clamp and release around the cylindrical or disc-shaped object. The end effector assembly may also include a rotation servomechanism (not shown) that drives the lens wheel to rotate at a regulated velocity and orientation.

In one controlling means, a sensor detects the position and orientation of the lens wheel relative to a loading/unloading point. This positional detection triggers the transmission of a signal to the lens wheel, or the rotation servomechanism, or the retention peg actuator. This creates rotational or pivotal articulation that orients, positions, and configures the lens wheel for optimal positioning of the object during loading and unloading. In a second controlling means, a human-machine interface allows an operator to input commands for control of the orientation, position, and configuration of the lens wheel, as well as for monitoring the position and orientation of the lens wheel.

In an alternative embodiment, the end effector assembly is operable with at least one robotic subassembly comprising an elongated adjustable body, a robotic head, and a robot sensor. The robotic head carries the cylindrical object to and from the lens wheel. The lens wheel may deposit the object to and from the lens wheel; while the lens wheel may also carry the object to a conveyor for subsequent transfer to a coating machine subassembly.

In one aspect, a robot-enabled end effector assembly, comprises:
- a spring-loaded lens wheel comprising a disc, the disc being defined by a radius and a center point;
- a plurality of springs operable along the radius of the disc;
- a plurality of retention pegs arranged radially on the disc, the retention pegs being operatively connected to the springs,
- whereby the springs selectively generate tension on the retention pegs, causing the retention pegs to articulate radially inward towards the center point, the inward radial articulation enabling the retention pegs to move proximally to the disc, so as to press a round object to the disc,
- whereby the springs selectively release tension from the retention pegs, causing the retention pegs to articulate radially outward away from the center point, the outward radial articulation enabling the retention pegs to move distally from the disc, so as to release the round object from the disc;
- a retention peg actuator selectively engaging the springs, the retention peg actuator operable to axially articulate, so as to generate tension and release tension from the springs;
- a processor operatively connected to the retention peg actuator, the processor regulating articulation of the retention peg actuator;
- a receiver operatively connected to the processor;
- a sensor detecting the position of the round object, whereby at least one position of the round object triggers the sensor to transmit a signal to the receiver, the signal commanding the retention peg actuator to articulate; and
- a human-machine interface operatively connected to the processor, the human-machine interface operable to transmit command signals to the processor and display the orientation, position, and configuration of the lens wheel and the retention pegs.

In another aspect, the assembly comprises a housing, the housing encasing at least a portion of the lens wheel.

In another aspect, the housing is cylindrical-shaped.

In another aspect, the housing comprises an at least partially transparent panel.

In another aspect, the housing comprises a plurality of standoff members arranged longitudinally along the transparent panel.

In another aspect, the housing comprises a pair of outer caps.

In another aspect, the outer caps comprise a mount bracket operable to mount the housing to a robotic arm of a robotic subassembly.

In another aspect, the robotic subassembly comprises an elongated adjustable body, a robot sensor, and the robotic arm.

In another aspect, the robotic arm carries the lens wheel with the object to a conveyor for transfer to a coating machine subassembly.

In another aspect, the assembly comprises a bell crank operatively connected to the retention peg actuator.

In another aspect, the sensor detects the position of the round object relative to the disc.

In another aspect, the retention peg actuator comprises a protruding member extendable to urge the springs away from the retention pegs, whereby the retention pegs release the round object from the disc, the protruding member retracting to disengage from the springs, whereby the retention pegs clamp the round object to the disc.

In another aspect, the assembly comprises a rotation servomechanism, the rotation servomechanism engaging the retention peg, the rotation servomechanism countering the articulation of the retention peg actuator.

In another aspect, the assembly further comprises a servo sensor, the servo sensor detecting the angular position of the retention peg actuator, the servo sensor commanding the rotation servomechanism to counter the articulation of the retention peg actuator.

In another aspect, the rotation servomechanism comprises an integral encoder and uses error-sensing negative feedback to counter the correct the rotation action.

In another aspect, the sensor, or the human-machine interface, or both comprise circuitry connected to the rotation servomechanism and retention peg actuator.

In another aspect, the round object is an ophthalmic substrate.

In another aspect, the ophthalmic substrate comprises a glass lens or a contact lens.

One objective of the present invention is to securely retain a cylindrical object or a disc-shaped object, such as an ophthalmic substrate, while it is being loaded, unloaded, or coated through physical vapor deposition.

Another objective is to increase productivity and product loss through more efficient grasping, loading, transfer, manipulation, and unloading means.

Another objective is to reduce repetitive, manual labor while grasping, loading, transfer, manipulation, and unloading of a round, cylindrical-shaped, disc-shaped object.

Another objective is to provide human-machine interface capabilities to the spring-loaded lens wheel.

Another objective is to provide a means to manipulate and carry an ophthalmic substrate that is operable through a human-machine interface.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An end effector assembly 100 and method 700 for robot-enabled manipulation of round objects is referenced in FIGS. 1-7. The end effector assembly 100, hereafter "assembly 100" provides robot-enabled manipulation, gripping, rotation, and releasing of a round object 506, such as an ophthalmic substrate. The round object 506 is manipulated for carrying, through use of a robotic subassembly 400 and conveyor 502, to a coating machine subassembly 500, such as a physical vapor deposition machine.

The assembly 100 provides a unique lens wheel 102 with spring-loaded retention pegs 108a, 108b, 108c that automate gripping, manipulating, loading, and unloading of the round object 506. A lens wheel 102 carries the spring-loaded retention pegs 108a-c that controllably grips and releases the round object 506. A plurality of springs 106a-b selectively generate tension on the retention pegs 108a-c, causing the retention pegs 108a-c to articulate radially inward or outward, so as to press the round object 506 to the lens wheel 102, or release the object 506.

A retention peg actuator 110 selectively engages the springs 106a-b to generate tension and release tension from springs 106a-b. A processor regulates articulation of the retention peg actuator 110. A sensor 118 detects at least one position of the round object 506 and/or the lens wheel 102.

The sensor 118 triggers a signal commanding the retention peg actuator 110 to articulate. At least one human-machine interface 504a, 504b allows an operator 604 to transmit command signals to the lens wheel 102, robotic subassembly 400, conveyor 502, and coating machine subassembly 500. The human-machine interface 504a-b displays a graphical interface 602 to enable viewing the position, configuration, and state of the lens wheel 102, the retention pegs 108a-c, robotic subassembly 400, conveyor 502, and coating machine subassembly 500.

Figure 1:
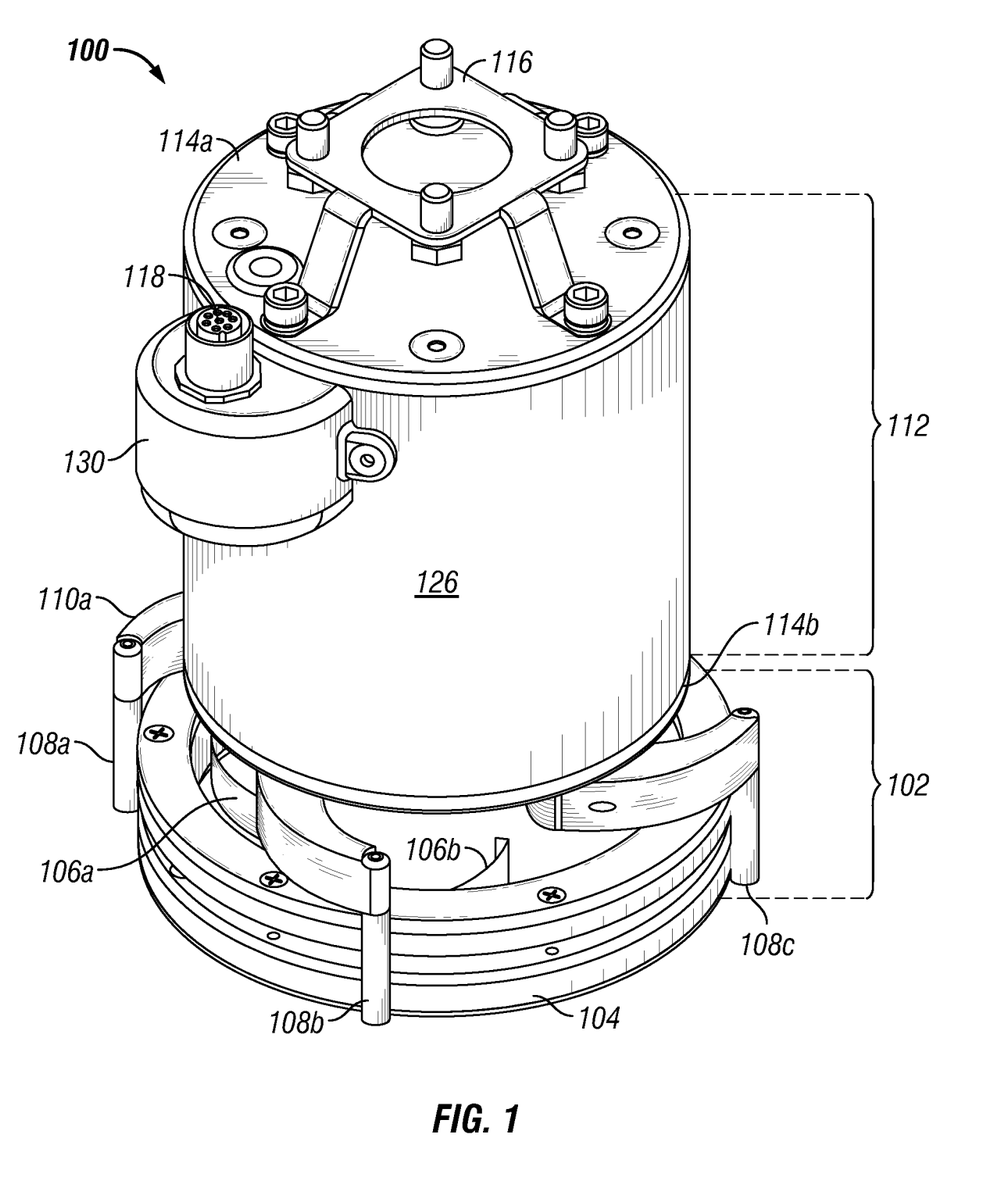
FIG. 1 illustrates a perspective view of an exemplary end effector assembly, in accordance with an embodiment of the present invention.

As referenced in FIG. 1, the end effector assembly 100 comprises a lens wheel 102 that is disc-shaped, and rotatable. In one possible embodiment, the lens wheel 102 comprises a disc 104 defined by a radius and a center point. The use of a disc-shaped lens wheel 102 is efficacious for the radial articulation of retention pegs 108a-c, described below. Also, the disc 104 matches the shape of the round object being manipulated, creating a more efficient mating relationship. It is significant to note that the round object 506 that is gripped and manipulated in the present invention may have a round shape, or a cylindrical shape, or a disc shape. Thus, the object can include an ophthalmic substrate, such as a glass lens or contact lens, that requires physical vapor deposition coating, or other process that involves grasping, loading, transfer, manipulation, and unloading of the round object 506.

As shown in FIG. 1, the assembly 100 comprises a housing 112 that is configured to encase at least a portion of the lens wheel 102. In one non-limiting embodiment, the housing 112 is cylindrical-shaped. Though in other embodiments, other shapes may be used. In some embodiments, the housing 112 comprises an at least partially transparent panel 126. This may include a glass or clear plastic lens having sufficient rigidity to operate in a manufacturing environment. The protective housing 112 may be transparent, so as to enable viewing the internal components, and may consist of glass or a see-through plastic material. In other embodiments, the housing 112 is opaque.

Figure 2:
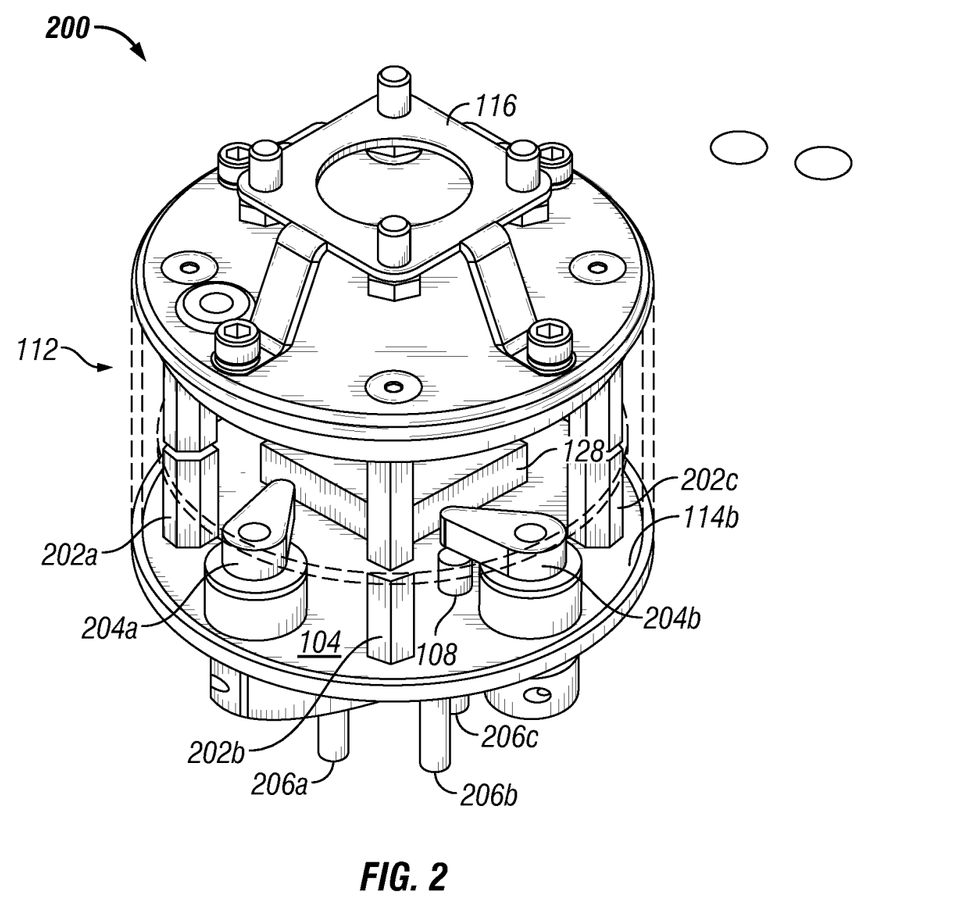
FIG. 2 illustrates a perspective view of an alternative embodiment of an end effector assembly, in accordance with an embodiment of the present invention.
Figure 3:
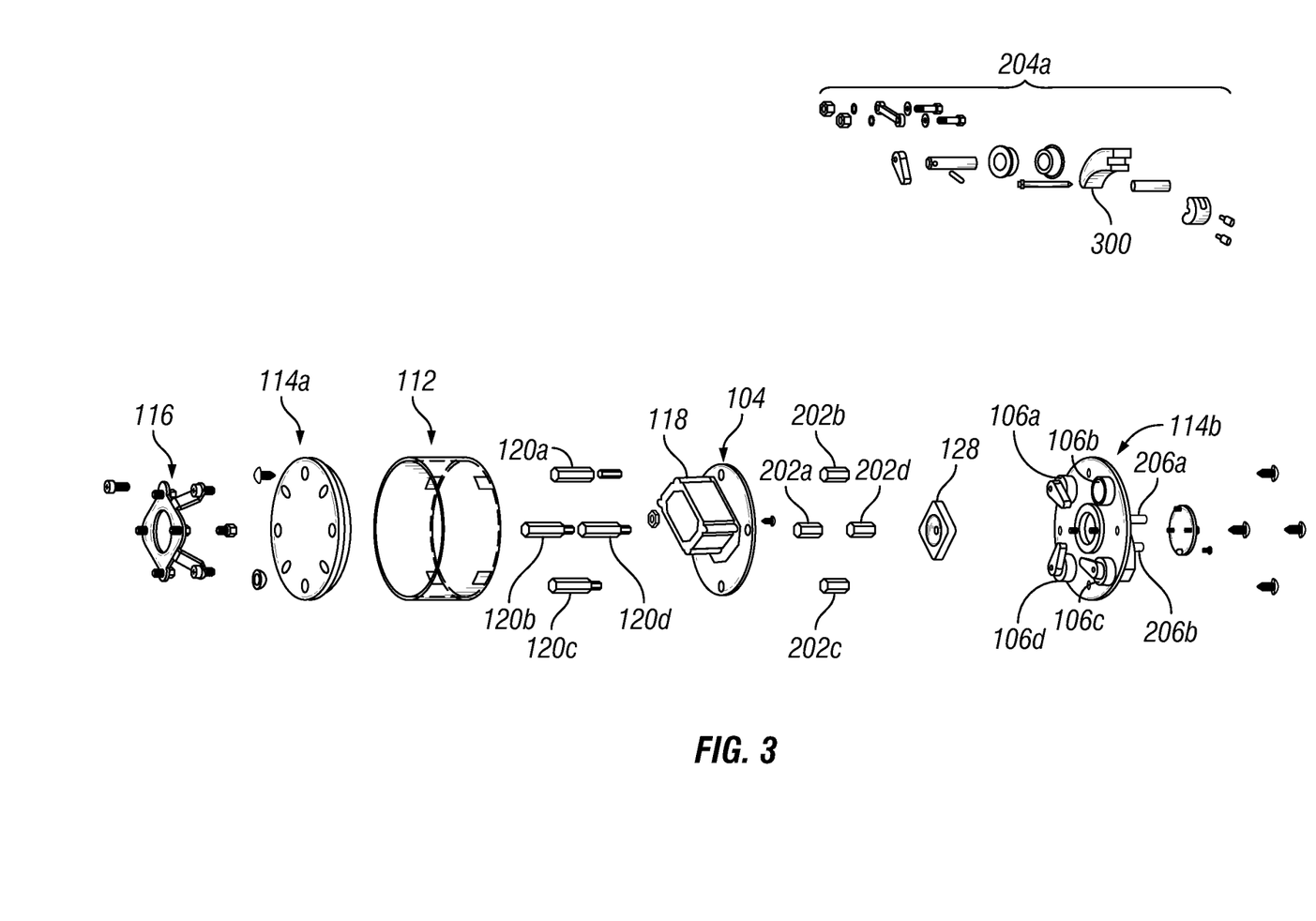
FIG. 3 illustrates a blow-up view of the robot-enabled end effector assembly shown in FIG. 2, in accordance with an embodiment of the present invention.

Looking at FIG. 2, an alternative embodiment of an end effector assembly 200, the housing 112 comprises a plurality of standoff members 202a, 202b, 202c, 202d that are arranged longitudinally along the transparent panel 126. The standoff members 202a-d includes stiff rods that protect the transparent panel 126 from damage and create axial stability. In some embodiments, the housing 112 comprises a pair of outer caps 114a, 114b. As FIG. 3 shows, the caps 114a, 114b include a cap that forms a terminus to the ends of the housing 112. The outer caps 114a-b are rigid and may fasten to the edges of the housing 112 through fasteners, a snap-fit relationship, magnets, or an adhesive. This forms an airtight, waterproof seal. The mount bracket 116 serves to detachably fasten the lens wheel 102 to a mounting surface, such as a conveyor 502, a robotic arm 404, or other anchoring structure.

Figure 4:
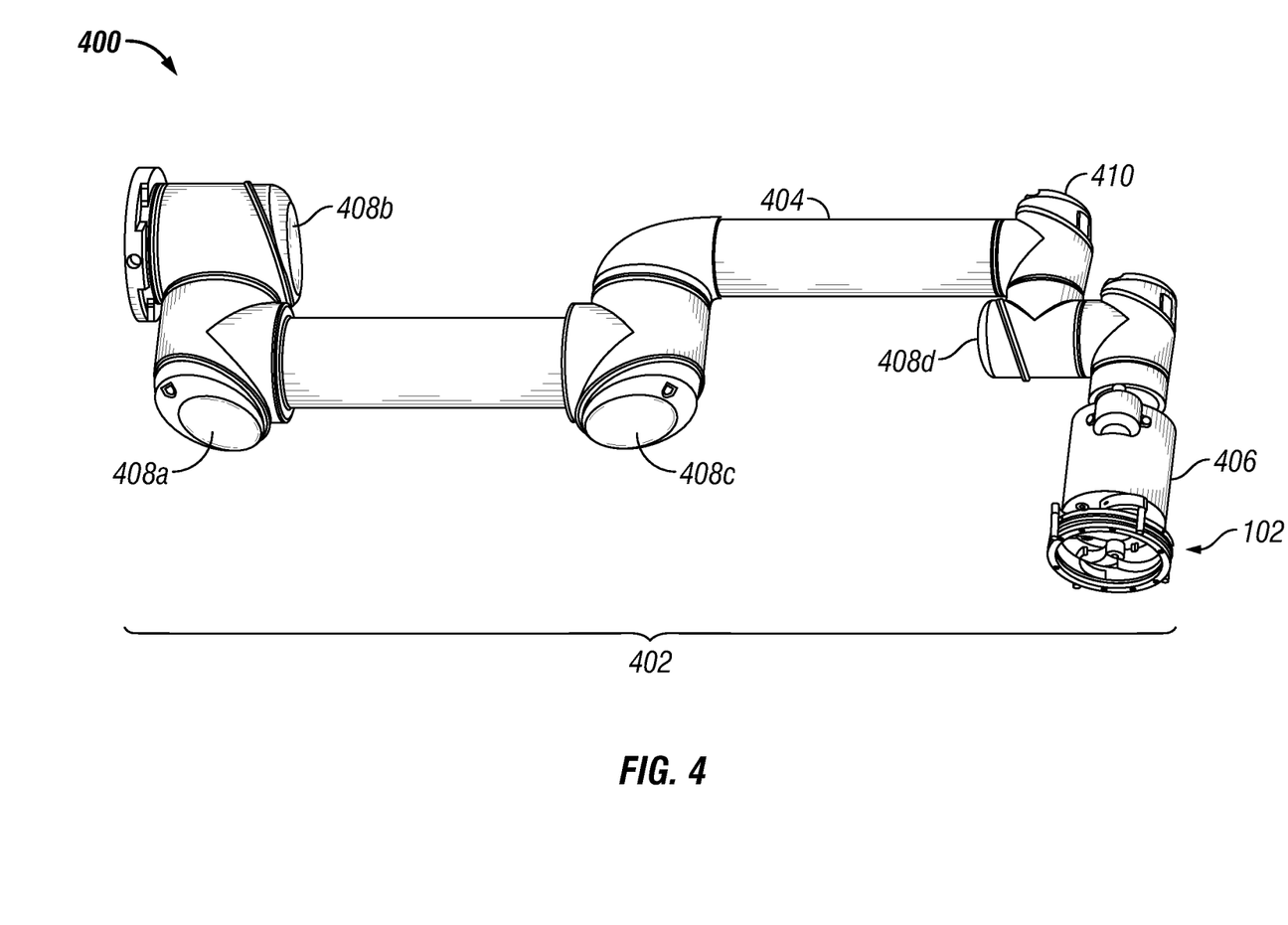
FIG. 4 illustrates a perspective view of an exemplary robotic subassembly, in accordance with an embodiment of the present invention.

In one alternative embodiment shown in FIG. 4, at least one robotic subassembly 400 feeds the object to the lens wheel 102, so that the object can be carried to and from a coating machine subassembly 100. The robotic subassembly 400 is defined by an elongated, adjustable body 402. The robotic subassembly 400 also comprises a robot sensor 410, and a robotic arm 404. The robotic arm 404 terminates at a robotic head 406 that mates with, and releases the object from the lens wheel 102.

The robotic arm 400 may have multiple rotatable and swiveling joints 408a, 408b, 408c, 408d that enable myriad points of articulation along the elongated adjustable body 402. This flexible maneuverability allows the operator to control the lens wheel more efficiently. In one embodiment, the robotic arm 404 carries the lens wheel 102 and the object to a conveyor 504 for transfer to a coating machine subassembly 500, where the round object 506, i.e., ophthalmic substrate, is coated through physical vapor deposition. The lens robot sensor 410 detects position of the robotic arm 404, and transmits this information to a processor 508 and at least one human-machine interface 504a-b, described below.

In some embodiments, a plurality of springs 106a-b are operable along the radius of the disc 104 of the lens wheel 102. The springs 106a-b create the tension necessary to articulate the retention pegs 108a-c for gripping and releasing the object. The springs 106a, 106b may include a metal coil, or fin coil that positions in a tensioned position in the lens wheel 102.

In other embodiments, the assembly 100 may include a plurality of retention pegs 108a-c arranged radially on the disc 104. The retention pegs 108a-c are operatively connected to the springs 106a-b. In one embodiment, the retention pegs 108a-c extend outwardly to receive the object. The retention pegs 108a-c are in selective contact with the springs 106a-b, such that the springs 106a-b release or clamp down on the retention pegs 108a-c to enable releasing or grasping of the object. In alternative form of the assembly 200 shown in FIG. 2, a plurality of retention pegs 206a, 206b, 206c are defined by a short cylindrical member that clamps around the round object 506. The retention pegs can take various shapes and dimensions, however, to accommodate different types of round objects.

The springs 106a-b selectively generate tension on the retention pegs 108a-c, causing the retention pegs 108a-c to articulate radially inward towards the center point. The inward radial articulation enabling the retention pegs 108a-c to move proximally to the disc 104, so as to press an object to the disc 104. Conversely, the springs 106a-b selectively release tension from the retention pegs 108a-c, causing the retention pegs 108a-c to articulate radially outward away from the center point. The outward radial articulation enabling the retention pegs 108a-c to move distally from the disc 104, so as to release the object from the disc 104.

Looking now at FIG. 3, the assembly 100 provides a retention peg actuator 110 that selectively engages the springs 106a-b. The retention peg actuator 110 operable to axially articulate, so as to generate tension and release tension from the springs 106a-b. In one non-limiting embodiment, a bell crank 300 operatively connects to the retention peg actuator 110. The bell crank 300 is operable to translate linear motion of the retention peg actuator 110 to rotational motion for rotational manipulation of the round object 506.

In one possible mechanical configuration, the retention peg actuator 110 comprises a protruding member that is extendable to urge the springs 106a-b away from the retention pegs 108a-c. The causes the retention pegs 108a-c to release the object from the disc 104. Also, the protruding member can retract to disengage from the springs 106a-b, causing the retention pegs 108a-c to clamp the object to the disc 104. This allows the retention peg to grip the object.

To regulate the articulation of the retention peg actuator 110, the assembly 100 utilizes a processor 508 that operatively connects to the retention peg actuator 110. The processor regulates the articulation of the retention peg actuator 110. Looking again at FIG. 2, the alternative embodiment of an end effector assembly 200 provides multiple retention peg actuators 204a, 204b that drive the retention pegs. The retention peg actuators 204a-b create a linkage for articulating the retention peg. This mechanism can include the bell crank 300 that translates the articulation of a linear motion to a rotational motion. Other mechanical conversion means known in the art may also be used however.

Figure 5:
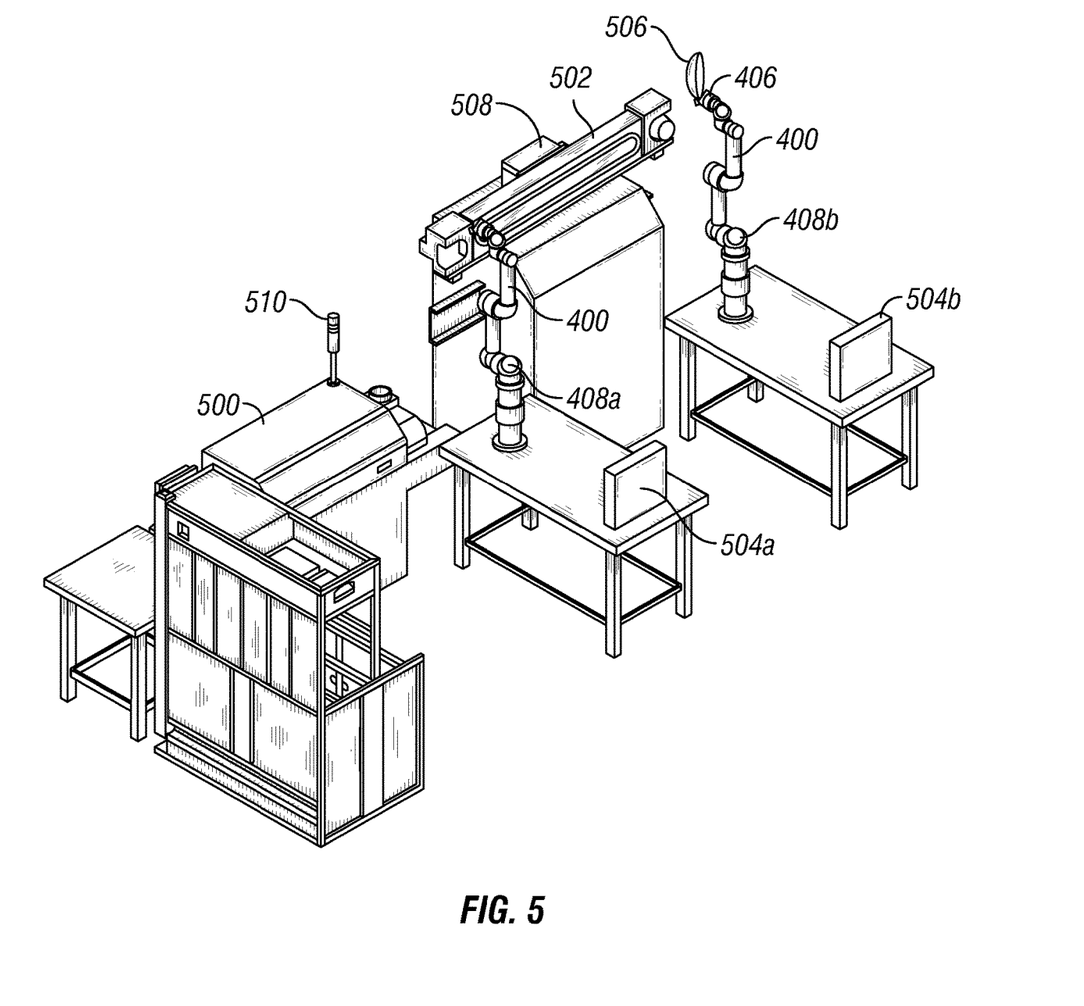
FIG. 5 illustrates a perspective view of an exemplary conveyor and coating machine subassembly operable with the robotic subassembly, in accordance with an embodiment of the present invention.

In one possible embodiment of the conveyer 500, the lens wheel 102, and specifically the retention pegs 108a-c automatically retains and releases the round object 506 during conveyance and coating functions. As FIG. 5 illustrates, the conveyor 500 comprises a pair of inclined rails that carry the spring-loaded lens wheel—urged by gravity—to the coating machine subassembly 500, i.e., vacuum deposition machine for the appropriate coating process. In an alternative embodiment, an escapement mechanism subassembly is operational on the inclined rails, and engaged with the lens wheel 102 transfers impulse action energy to the lens wheel to regulate the speed and direction of the lens wheel 102 while riding across the inclined rails with the round object 506.

Further, the assembly 100 includes a sensor 118 that is configured to detect the position of the object. This allows the sensor 118 to determine the extent of articulation by the retention pegs 108a-c. Thus, the sensor 118 is also configured to detect the position of the object relative to the disc 104. The sensor 118 detects at least one position of the object, and transmits a signal to the receiver and the processor. The signal may be a command to articulate the retention peg actuator 110.

The sensor 118 may include a passive infrared motion sensor, a gesture detector, or other motion detection means known in the art. The sensor 118 is operationally connected to a processor that calculate positions and orientations, so as to orient the lens wheel 102 in the desire direction and orientation, such as towards a robotic subassembly 400. This allows for efficient gripping and retention of the object by the lens wheel 102.

For example, if the sensor 118 detects the robotic head 406 oriented orthogonally to the lens wheel 102, the sensor 118 initiates a signal to the control unit or a dedicated processor that actuates the lens wheel 102 to rotate 90° for receiving the round object 506. The sensor 118 allows the robotic subassembly 400 to orient the object to an optimal position for fastening, removing, and orienting the object to the lens wheel 102. In one exemplary use, the lens wheel 102 carries an ophthalmic substrate to a coating machine subassembly 500 for physical vapor deposition coating.

In another embodiment, the assembly 100 includes a rotation servomechanism 130 that engages the retention peg 108a, 108b, 108c, providing position control functionality. The rotation servomechanism 130 counters the articulation of the retention peg actuator 110. The rotation servomechanism 130 that automatically rotates the lens wheel 102 to an optimal orientation for coating. The rotation servomechanism 130 rotates the lens wheel 102 at a controlled orientation. The rotation servomechanism 130 also controls the mechanical position, speed, and other parameters of the lens wheel 102. In one non-limiting embodiment, the rotation servomechanism 130 engages a bell crank 132 that creates a linear action of the articulation pegs 108a-c. The bell crank 132 is translated, by the bell crank to rotational articulation. The bell crank 132 pivots and/or translates linear motion to rotational motion.

In one possible embodiment, the assembly 100 also provides a servo sensor 128 that is configured to detect the angular position of the retention peg actuator 110. The servo sensor 128 commands the rotation servomechanism 130 to counter the articulation of the retention peg actuator 110. In another embodiment, the servo sensor 128 detects the orientation of the lens wheel 102 and transits a signal to the lens wheel 102 to rotate at a desired orientation and speed. This helps regulate the angular velocity of the lens wheel 102. For example, the rotation is preset to rotatably operate at a slow, 360° rotation in a clockwise direction that allows for uniform coating of the entire surface of the object in the coating machine subassembly 500.

In one embodiment, the rotation servomechanism 130 may be electrical, hydraulic, or pneumatic. The rotation servomechanism 130 operates with negative feedback, where control input is compared to the actual position of the mechanical system as measured by a transducer. In some embodiments, the rotation servomechanism 130 comprises an integral encoder and uses error-sensing negative feedback to counter the correct the rotation action. The servo sensor 128 has a circuitry connected to the rotation servomechanism 130 and the retention peg actuator 110.

In some embodiments, the assembly 100 may include a receiver 510 that operatively connects to the processor 508. The use of a receiver 510 allows the operator 604 to transmit command signals to control the lens wheel and retention peg actuator for control of the retention pegs. The operator 604 can also control the coating machine subassembly 500 and conveyor 502. In yet another embodiment, the operator 604 can control the robotic subassembly 400 for carrying the round object 506 to and from the lens wheel 102, conveyor 502, and coating machine subassembly 500. For the present invention, the receiver 510 and processor 508 are operatively connected to at least one of the following: the lens wheel 102, the actuator 110, the robotic subassembly 400, the conveyor 502, the coating machine subassembly 500, the robot sensor 410, and at least one human-machine interface 504a, 504b, described below.

Figure 6:
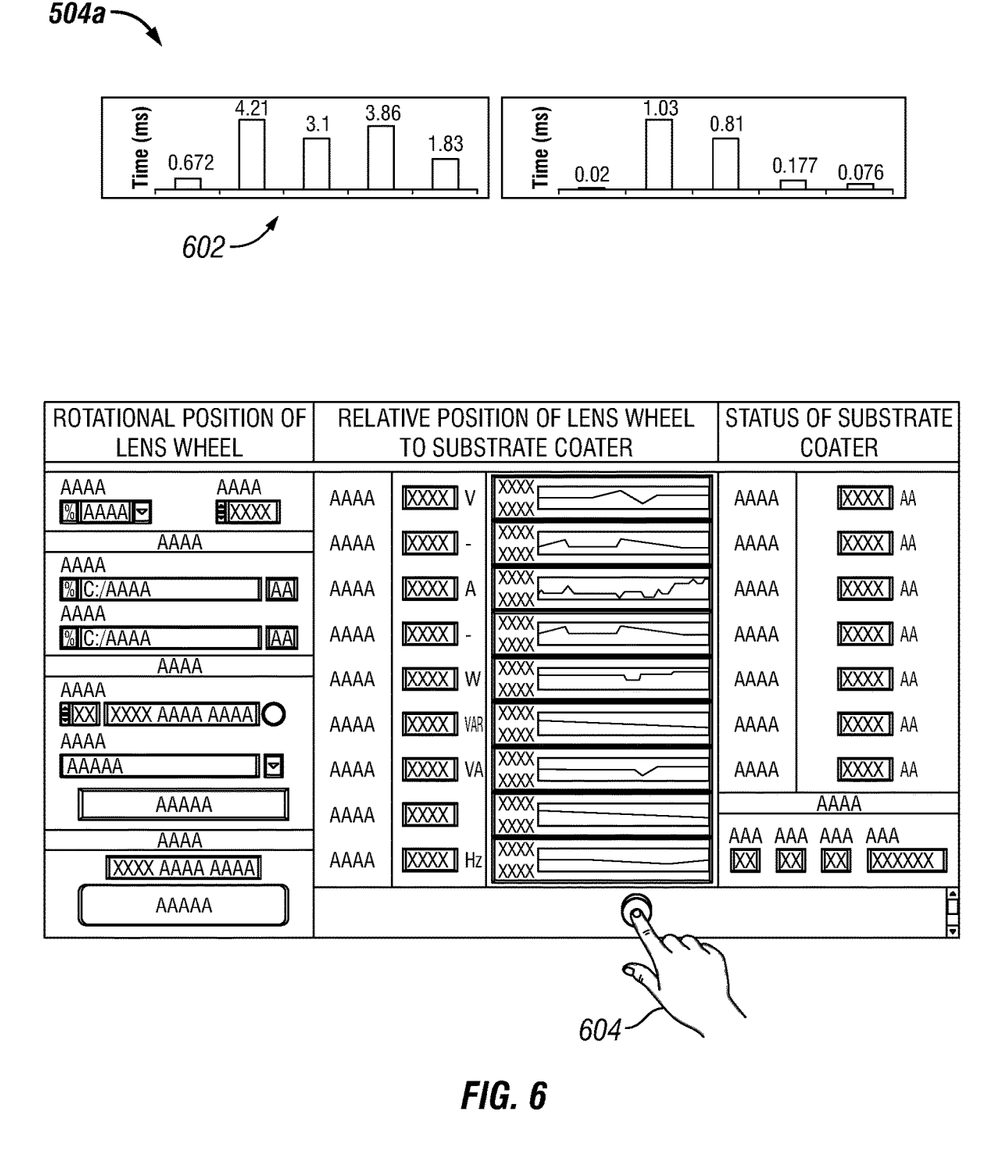
FIG. 6 illustrates a screenshot of an exemplary human-machine interface, in accordance with an embodiment of the present invention.

As FIG. 6 illustrates, the assembly 100 may also include at least one human-machine interface 504a, 504b (HMI) that operatively connects to the processor. The HMI 504a-b is operable to transmit command signals to the processor 508. The human-machine interface is also configured to display the orientation, position, and configuration of the lens wheel 102 and the retention pegs 108a-c. In one embodiment, the HMI 504a-b has a circuitry connected to the rotation servomechanism and retention peg actuator 110.

In one possible embodiment, the HMI 504a-b includes a software program with instructions for receiving data that is pertinent to the conveyance and coating of the object. The data may include, without limitation, data indicative of the position of the spring-loaded lens wheel 102 relative to the substrate coating device; data indicative of the position of the springs 106a-b relative to the substrate; and data indicative of the rotational position of the lens wheel 102. The software program also includes instructions for displaying a status of the position and orientation of the spring-loaded lens wheel 102.

Looking again at FIG. 6, the HMI 504a-b includes a graphical interface 602 to control and program the various aspects of the conveyor 502 and the substrate coating device 500. The operator 604 engages various switches on the display to view and control a graphical interface 602 of the lens wheel, retention pegs, robotic subassembly, and other dynamic components of the assembly 100. In one non-limiting embodiment, the HMI 504a-b consists of hardware and software that allow the operator command inputs to be translated as signals for the end effector assembly 100 that, in turn, provide the required gripping results. Thus, both the sensor 118 and the HMI 504a-b manipulate the lens wheel 102, so that the round object 506 is coated to a desired specification.

The sensor 118 and the HMI 504a-b also serves to control the retention peg actuator 110 for clamping and releasing the object in the retention pegs 108a-c of the lens wheel 102. In one non-limiting embodiment, the sensor 118 and the HMI 504a-b comprise circuitry connected to the rotation servomechanism and retention peg actuator 110. The HMI 504a-b may also include a power source, or be connected to an external power source. In one non-limiting embodiment, the HMI 504a-b rests on the robot support platform to provide the operator with an eye-level access to input terminals.

Figure 7:
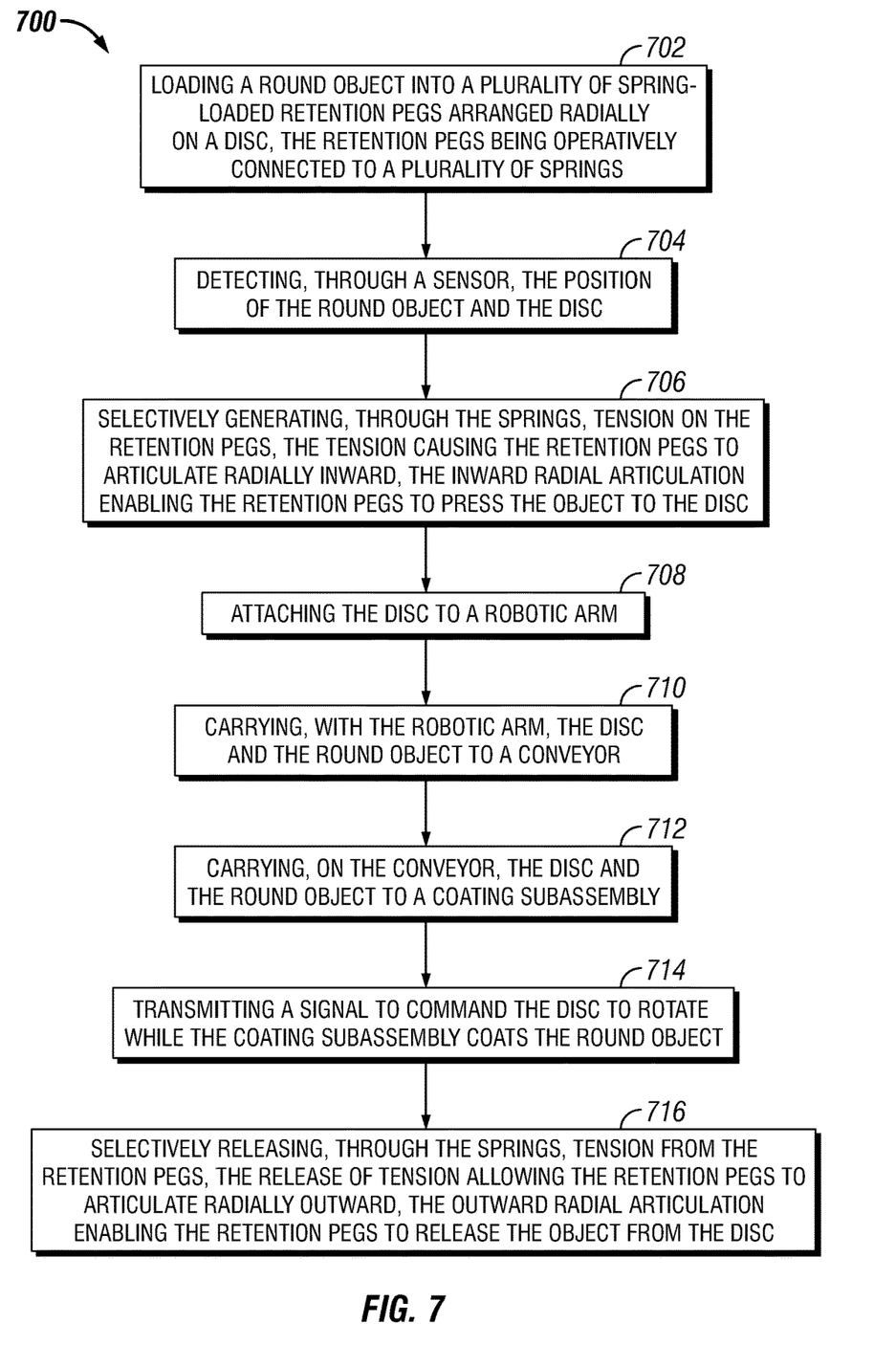
FIG. 7 illustrates a flowchart of an exemplary method for robot-enabled manipulation of round objects, in accordance with an embodiment of the present invention.

FIG. 7 illustrates a flowchart of an exemplary method 700 for robot-enabled manipulation of round objects with an end effector assembly. The method 700 may include an initial Step 702 of loading a round object into a plurality of spring-loaded retention pegs arranged radially on a disc, the retention pegs being operatively connected to a plurality of springs. The spring retention is controllably by the operator, so as to controllably grip and release the round object 506.

The method 700 may further comprise a Step 704 of detecting, through a sensor, the position of the round object and the disc. A Step 706 includes selectively generating, through the springs, tension on the retention pegs, the tension causing the retention pegs to articulate radially inward, the inward radial articulation enabling the retention pegs to press the object to the disc. Based on the detect position of the lens wheel, the rotational position of the round object can be manipulated for loading, unloading, and rotational configurations of the round object 506.

In some embodiments, a Step 708 comprises attaching the disc to a robotic arm. At least one robotic subassembly 400 feeds the object to the lens wheel 102, so that the round object 506 can be carried to and from a coating machine subassembly 100. The robotic subassembly 400 is defined by an elongated, adjustable body 402 that terminates at a robotic head 406. A Step 710 includes carrying, with the robotic arm, the disc and the round object to a conveyor. In some embodiments, a Step 712 may include carrying, on the conveyor, the disc and the round object to a coating machine subassembly.

The method 700 may further comprise a Step 714 of transmitting a signal to command the disc to rotate while the coating machine subassembly coats the round object. The receiver 510 and processor 508 are operatively connected to the lens wheel 102, the actuator 110, the robotic subassembly 400, the conveyor 502, the coating machine subassembly 500, and at least one human-machine interface 504a, 504b, described below. In this manner, the operator 604 can control all aspects of the assembly 100. A final Step 716 includes selectively releasing, through the springs, tension from the retention pegs, the release of tension allowing the retention pegs to articulate radially outward, the outward radial articulation enabling the retention pegs to release the object from the disc. This articulation is completely automated, or controllable by an operator through the HMI 504a-b.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

In conclusion, the end effector assembly 100 and method 700 for robot-enabled manipulation of round objects automates the gripping, rotationally manipulating, loading, and unloading of round objects, like an ophthalmic substrate, to a coating machine subassembly. A lens wheel 102 carries spring-loaded retention pegs 108a-c that grip and release the round object. Springs 106a-b selectively generate tension on the retention pegs 108a-c, causing the retention pegs to articulate radially inward or outward, so as to press the round object to the lens wheel, or release the object. A retention peg actuator 110 selectively engages the springs to generate tension and release tension from springs. A processor 508 regulates articulation of the retention peg actuator. A sensor detects the position of the object, whereby at least one position of the round object triggers the sensor to transmit a signal commanding the retention peg actuator to articulate. The HMI 504a-b transmits command signals and displays the position of lens wheel 102 and retention pegs 108a-c.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An end effector assembly, the assembly comprising:
   a lens wheel comprising a disc, the disc being defined by a radius and a center point;
   a plurality of springs operable along the radius of the disc;
   a plurality of retention pegs arranged radially on the disc, the retention pegs being operatively connected to the springs,
   whereby the springs selectively generate tension on the retention pegs, causing the retention pegs to articulate radially inward towards the center point, the inward radial articulation enabling the retention pegs to move proximally to the disc, so as to press an object to the disc,
   whereby the springs selectively release tension from the retention pegs, causing the retention pegs to articulate radially outward away from the center point, the outward radial articulation enabling the retention pegs to move distally from the disc, so as to release the object from the disc;
   a retention peg actuator selectively engaging the springs, the retention peg actuator operable to axially articulate, so as to generate tension and release tension from the springs;
   a processor operatively connected to the retention peg actuator, the processor regulating articulation of the retention peg actuator; and
   a sensor detecting a position of the object, whereby at least one position of the object triggers the sensor to transmit a signal to the processor, the signal commanding the retention peg actuator to articulate.

2. The assembly of claim 1, wherein the assembly comprises a housing having two ends, the housing encasing at least a portion of the lens wheel.

3. The assembly of claim 2 wherein the housing comprises an at least partially transparent panel.

4. The assembly of claim 3, wherein the housing comprises a plurality of standoff members arranged longitudinally along the transparent panel.

5. The assembly of claim 4, wherein the housing comprises a pair of outer caps.

6. The assembly of claim 5, further comprising a pair of outer caps disposed at the ends of the housing, the outer caps comprising a mount bracket operable to mount the housing to a robotic subassembly.

7. The assembly of claim 6, wherein the robotic subassembly comprises an elongated, adjustable body having multiple rotatable and swiveling joints, the adjustable body terminating at a robotic head, the robotic subassembly further comprising a robot sensor and a robotic arm.

8. The assembly of claim 7, wherein the robotic arm carries the lens wheel with the object to a conveyor for transfer to a coating machine subassembly.

9. The assembly of claim 1, further comprising a bell crank operatively connected to the retention peg actuator.

10. The assembly of claim 1, wherein the sensor detects a position of the object relative to the disc.

11. The assembly of claim 1, wherein the retention peg actuator comprises a protruding member extendable to urge the springs away from the retention pegs, whereby the retention pegs release the object from the disc, the protruding member retracting to disengage from the springs, whereby the retention pegs clamp the object to the disc.

12. The assembly of claim 1, further comprising a rotation servomechanism, the rotation servomechanism engaging the retention peg, the rotation servomechanism countering the articulation of the retention peg actuator.

13. The assembly of claim 12, wherein the retention peg includes an angular position, and the assembly further comprising a servo sensor, the servo sensor detecting the angular position of the retention peg actuator, the servo sensor commanding the rotation servomechanism to counter the articulation of the retention peg actuator.

14. The assembly of claim 13, wherein the sensor, or a human-machine interface, or both comprise circuitry connected to the rotation servomechanism and retention peg actuator.

15. The assembly of claim 1, further comprising at least one human-machine interface operatively connected to the processor, the human-machine interface operable to transmit command signals to the processor and display, through a graphical interface, a position of the lens wheel and the retention pegs.

16. The assembly of claim 1, wherein the object has a generally round, or spherical, or cylindrical shape.

17. The assembly of claim 1, further comprising a receiver operatively connected to the processor, the receiver receiving the signal from the sensor or a human-machine interface, the receiver transmitting a signal to the processor.

18. An end effector assembly, the assembly comprising:
   a lens wheel comprising a disc, the disc being defined by a radius and a center point;
   a housing, having two ends, encasing at least a portion of the lens wheel;
   a plurality of springs operable along the radius of the disc;
   a plurality of retention pegs arranged radially on the disc, the retention pegs being operatively connected to the springs,
   whereby the springs selectively generate tension on the retention pegs, causing the retention pegs to articulate radially inward towards the center point, the inward radial articulation enabling the retention pegs to move proximally to the disc, so as to press a round object to the disc,
   whereby the springs selectively release tension from the retention pegs, causing the retention pegs to articulate radially outward away from the center point, the outward radial articulation enabling the retention pegs to move distally from the disc, so as to release the round object from the disc;

a retention peg actuator selectively engaging the springs, the retention peg actuator operable to axially articulate, so as to generate tension and release tension from the springs;

a rotation servomechanism, the rotation servomechanism engaging the retention peg, the rotation servomechanism countering the articulation of the retention peg actuator;

a processor operatively connected to the retention peg actuator, the processor regulating articulation of the retention peg actuator;

a receiver operatively connected to the processor;

a sensor detecting a position of the round object, whereby at least one position of the round object triggers the sensor to transmit a signal to the receiver, the signal commanding the retention peg actuator to articulate;

a robotic subassembly comprising an elongated, adjustable body having multiple rotatable and swiveling joints, the adjustable body terminating at a robotic head, the robotic subassembly further comprising a robot sensor and a robotic arm;

a pair of outer caps disposed at the ends of the housing, the outer caps comprising a mount bracket operable to mount the housing to the robotic arm of the robotic subassembly, whereby the robotic arm carries the lens wheel with the round object to a conveyor for transfer to a coating machine subassembly; and a human-machine interface operatively connected to the processor, the human-machine interface operable to transmit command signals to the processor through the receiver, the human-machine interface also operable to display, through a graphical interface, the position of the lens wheel and the retention pegs.

19. A method for robot-enabled manipulation of a round object, the method comprising:

loading a round object into a plurality of spring-loaded retention pegs arranged radially on a disc, the retention pegs being operatively connected to a plurality of springs;

detecting, through a sensor, a position of the round object and the disc;

selectively generating, through the springs, tension on the retention pegs, the tension causing the retention pegs to articulate radially inward, the inward radial articulation enabling the retention pegs to press the object to the disc;

attaching the disc to a robotic arm;

carrying, with the robotic arm, the disc and the round object to a conveyor;

carrying, on the conveyor, the disc and the round object to a coating machine subassembly;

transmitting a signal to command the disc to rotate while the coating machine subassembly coats the round object; and selectively releasing, through the springs, tension from the retention pegs, the release of tension allowing the retention pegs to articulate radially outward, the outward radial articulation enabling the retention pegs to release the object from the disc.

* * * * *